US010379819B2

(12) United States Patent
Leigh et al.

(10) Patent No.: US 10,379,819 B2
(45) Date of Patent: Aug. 13, 2019

(54) GENERIC EDITOR LAYOUT USING INTRINSIC PERSISTENCE METADATA

(71) Applicant: Oracle International Corporation, Redwood Shores, CA (US)

(72) Inventors: John Westworth Leigh, Sonoma, CA (US); Kwok Hung Lau, Mountain View, CA (US); Daniel A. Gallagher, Naperville, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 610 days.

(21) Appl. No.: 14/866,672

(22) Filed: Sep. 25, 2015

(65) Prior Publication Data

US 2016/0092049 A1    Mar. 31, 2016

Related U.S. Application Data

(60) Provisional application No. 62/056,463, filed on Sep. 26, 2014, provisional application No. 62/056,465, filed on Sep. 26, 2014, provisional application No. 62/083,122, filed on Nov. 21, 2014.

(51) Int. Cl.
*G06F 8/34* (2018.01)
*G06F 8/35* (2018.01)
*G06F 8/20* (2018.01)
*G06F 8/38* (2018.01)

(52) U.S. Cl.
CPC .............. *G06F 8/34* (2013.01); *G06F 8/20* (2013.01); *G06F 8/35* (2013.01); *G06F 8/38* (2013.01)

(58) Field of Classification Search
None
See application file for complete search history.

(56) References Cited

U.S. PATENT DOCUMENTS

| 6,996,566 | B1 | 2/2006 | George et al. |
| 9,406,044 | B2 | 8/2016 | Brunswig et al. |
| 9,418,127 | B2 | 8/2016 | Xiong |
| 2004/0015858 | A1* | 1/2004 | Seto ................. G06F 9/449 717/120 |
| 2004/0210607 | A1 | 10/2004 | Manchanda et al. |
| 2007/0074167 | A1* | 3/2007 | Cohrs ............... G06F 11/3672 717/124 |

(Continued)

OTHER PUBLICATIONS

Final Office Action for U.S. Appl. No. 14/866,641 dated Oct. 22, 2018, 15 pages.

(Continued)

*Primary Examiner* — Francisco J Aponte
*Assistant Examiner* — Mark A Gooray
(74) *Attorney, Agent, or Firm* — Kilpatrick Townsend & Stockton LLP

(57) ABSTRACT

The present disclosure relates generally to a data integration system that may dynamically generate a GUI for an object model of arbitrary complexity while maintaining GUI usability. In some embodiments, the dynamically generated GUI may be generated from an object model definition received from a user. In some embodiments, the object model may be derived from the user's code and then the GUI may be dynamically generated based on the derived object model.

23 Claims, 10 Drawing Sheets

(56) References Cited

U.S. PATENT DOCUMENTS

2009/0089746 A1* 4/2009 Rigolet ................ G06F 9/4492
717/113
2011/0035354 A1 2/2011 Wan

OTHER PUBLICATIONS

Non-Final Office Action for U.S. Appl. No. 14/866,641 dated Mar. 30, 2018.
Non-Final Office Action for U.S. Appl. No. 14/866,641 dated Apr. 2, 2019, 15 pages.

* cited by examiner

```
                              ╭─340
┌─────────────────────────────────────────────────────────────────────┐
│  # master layout                                                    │
│  Layout = \                                                         │
│       page.Definition,\                                             │
│ 342──     heading.Binding,\                                         │
│           heading.OrphanManagement,\                                │
│ 344──   page.Levels,\                                               │
│           heading.LevelAttributes,\                                 │
│           heading.ApplicationKeyMembers,\                           │
│           heading.ParentLevelReferences,\                           │
│ 346──   page.Hierarchies                                            │
│                                                                     │
│       # regular controls                                            │
│       # Each line has a comma-separated list of information for one control: │
│       # 1. container (a page or a heading) in which this control is contained │
│       # 2. order of this control within that container              │
│       # 3. type of this control: TEXTFIELD,TEXTAREA,COMBO,RADIO     │
│ 3002── Dimension_Name.layout                = page.Definition,0,TEXTFIELD │
│ 3004── Dimension_Description.layout         = page.Definition,1,TEXTAREA │
│ 3006── Dimension_ImplementationType.layout  = page.Definition,2,RADIO │
│ 3007b─ Dimension_BoundTable.layout          = heading.Binding,0,COMBO │
│ 3007c─ Dimension_BoundErrorTable.layout     = heading.Binding,1,COMBO │
│ 3007d─ Dimension_BoundSequence.layout       = heading.Binding,2,COMBO │
│ 3009a─ Dimension_InvalidParentOption.layout = heading.OrphanManagement,0,RADIO │
│ 3009b─ Dimension_NullParentOption.layout    = heading.OrphanManagement,1,RADIO │
│ 3009c─ Dimension_OrphanRemovalOption.layout = heading.OrphanManagement,2,RADIO │
│ 3012c─ Level_BoundTable.layout              = 0,0,COMBO             │
│ 3012e─ Level_BoundErrorTable.layout         = 0,0,COMBO             │
│ 3012d─ Level_BoundStagingTable.layout       = 0,0,COMBO             │
│ 3012b─ Level_SurrogateKeyAttribute.layout   = 0,0,COMBO             │
│                                                                     │
│       # tables                                                      │
│ 3012── Dimension_Levels.layout              = page.Levels           │
│ 3014── Level_LevelAttributes.layout         = heading.LevelAttributes │
│ 3016── Level_ApplicationKeyMembers.layout   = heading.ApplicationKeyMembers │
│ 3018── Level_ParentRefs.layout              = heading.ParentLevelReferences,0 │
│ 3019── ParentRef_RefMembers.layout          = heading.ParentLevelReferences,1 │
│ 3022── Dimension_Hierarchies.layout         = page.Hierarchies,0    │
│ 3024── Hierarchy_HierMembers.layout         = page.Hierarchies,1    │
│ 3026── HierarchyMember_SkipLevels.layout    = page.Hierarchies,2    │
│                                                                     │
│       # pages (translations)                                        │
│ 3001── page.Definition = Definition                                 │
│ 3011── page.Levels = Levels                                         │
│ 3021── page.Hierarchies = Hierarchies                               │
│                                                                     │
│       # headings (translations)                                     │
│ 3007a─ heading.Binding = Binding                                    │
│ 3008a─ heading.OrphanManagement = Orphan Management Settings        │
│ 3014a─ heading.LevelAttributes = Level Attributes                   │
│ 3016a─ heading.ApplicationKeyMembers = Application Key Members      │
│ 3018a─ heading.ParentLevelReferences = Parent Level References      │
└─────────────────────────────────────────────────────────────────────┘
```

*FIG. 3D*

GENERIC EDITOR LAYOUT USING INTRINSIC PERSISTENCE METADATA

RELATED APPLICATIONS

This Application claims the benefit of and priority to U.S. Provisional Application No. 62/056,463, filed Sep. 26, 2014 and entitled "GENERIC EDITOR LAYOUT USING INTRINSIC PERSISTENCE METADATA," U.S. Provisional Application No. 62/056,465, filed Sep. 26, 2014 and entitled "GENERIC EDITOR LAYOUT USING INTRINSIC PERSISTENCE METADATA AND PATTERN-BASED RULES FOR MAPPING TRANSFORMATION," and U.S. Provisional Application No. 62/083,122, filed Nov. 21, 2014 and entitled "BUSINESS LEVEL OBJECT MAPPING USING INTRINSIC PERSISTENCE METADATA AND PATTERN-BASED RULES FOR MAPPING TRANSFORMATION," the entire disclosure of which are incorporated herein by reference for all purposes.

This Application is related to U.S. application Ser. No. 14/866,642, filed Sep. 25, 2015 and entitled "OBJECT MAPPING USING INTRINSIC PERSISTENCE METADATA AND PATTERN-BASED RULES FOR MAPPING TRANSFORMATION," the entire disclosure of which is incorporated herein by reference for all purposes.

BACKGROUND

An object model may define objects and their relationships. An object may generally refer to a data structure used to either store or reference data. Using the object model, various object instances may be instantiated and/or persisted. Object models may vary greatly, and typically a new editor (e.g. a graphical user interface) needs to be created (e.g., coded) specifically for a given object model.

Currently, when a new object model is introduced, an editor such as a graphical user interface (GUI) needs to be manually designed and coded to support editing the new object model. For example, the new object model may include various classes and characteristics that need to be editable, but were not previously exposed through an existing GUI. This adds to the time and support required during development.

BRIEF SUMMARY

Techniques are provided to dynamically generate a graphical user interface (GUI) for an object model of arbitrary complexity while maintaining GUI usability. This reduces development time and supports editing of an arbitrary object model. In some embodiments, the dynamically generated GUI may be generated from an object model definition received from a user. In some embodiments, the object model may be derived from the user's code by, for example, an object model generator module. Subsequently, the GUI may be dynamically generated based on the derived object model.

Upon receiving the object model from the user or the object model generator module, the object model may be analyzed to extract persistence metadata from the object model. In some embodiments, the metadata may be extracted using data provided in a configuration file associated with the object model or using additional data such as annotations and naming conventions associated with the object model. The metadata may be used to generate a GUI layout. According to various embodiments, capabilities such as create, read, update and delete (CRUD) actions for the objects in the object model may be provided through user interface (UI) controls incorporated in the generated GUI without additional manual coding.

In some embodiments, the extracted metadata may include a list of persistent fields associated with one or more objects of the object model. The extracted metadata may also include relationships between the objects in the object model. For example, the extracted metadata may include one or more of a one-to-many ownership relationship, a one-to-one ownership relationship, or a one-to-one reference relationship. These relationships may be rendered on the GUI using UI controls, such as a table control, a dropdown box, a textbox, a text field, a radio button and the like.

In certain embodiments, techniques (including methods, systems, code or software instructions executed by one or more processors) are provided for receiving, by a generic editor framework, an object model. The object model may be received from a user. Alternatively, the object model may be received from an object model generator of the generic editor framework. The object model generator may generate the object model based on a user-provided code. The object model may define a plurality of objects. The plurality of objects may include a first class object and at least one second class object such that a relationship between the first class object and the at least one second class object is a one-to-many ownership relationship or a one-to-one ownership relationship. The plurality of objects may further include at least one second class object associated with the first class object and one or more second class objects associated with the at least one second class object.

The generic editor framework may analyze the object model to extract metadata from the object model. The metadata may describe the plurality of objects of the object model and relationships among the plurality of objects of the object model. The generic editor framework may dynamically generate a graphical user interface editor for the object model based on the metadata. In some embodiments, the graphical user interface editor may be generated by a graphical user interface generation module of the generic editor framework such that the graphical user interface generation module is compatible with a plurality of object models including the received object model. The object model may be manipulated by editing instances of the object model via the graphical user interface editor.

In some embodiments, the generic editor framework may identify a configuration file associated with the object model and extract the metadata based on data included in the configuration file. Yet in other embodiments, the generic editor framework may identify additional data incorporated within the object model and extract the metadata based on the additional data. The additional data may include annotations and pre-determined naming convention(s) used in the object model.

In some embodiments, the metadata may include one or more of a plurality of fields storing primitive values, a one-to-many ownership relationship among the plurality of objects, a one-to-one ownership relationship among the plurality of objects, a one-to-one reference relationship among the plurality of objects, and an extension relationship among the plurality of objects. The one-to-one reference relationship may be rendered as a dropdown box in the graphical user interface editor and the one-to-many ownership relationship may be rendered as a table control in the graphical user interface editor.

Moreover, the metadata may be used to generate user interface controls in the graphical user interface editor, the user interface controls including a table control, a dropdown box, a textbox, a text field or a radio button. In some embodiments, the graphical user interface editor may include user interface controls to create, remove or reorder the plurality of objects based on the relationships among the plurality of objects.

BRIEF DESCRIPTION OF THE DRAWINGS

Illustrative embodiments of the present invention are described in detail below with reference to the following drawing figures:

FIGS. 3A-3D show examples of a dynamically generated graphical user interface, in accordance with an embodiment of the present invention.

DETAILED DESCRIPTION

In the following description, for the purposes of explanation, specific details are set forth in order to provide a thorough understanding of embodiments of the invention. However, it may be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Techniques are provided to dynamically generate a graphical user interface (GUI) for an object model of arbitrary complexity while maintaining GUI usability. This reduces development time and supports editing of an arbitrary object model. In some embodiments, the dynamically generated GUI may be generated from an object model definition received from a user. In some embodiments, the object model may be derived from the user code and then the GUI may be dynamically generated based on the derived object model.

In some embodiments, a data integration system may extract persistence metadata associated with an object model and generate a GUI layout based on the persistence metadata. The object model may be received from a user or may be generated by an object model generation module of the data integration system based on user code. In some embodiments, the metadata may be extracted using data provided in a configuration file associated with the object model or using additional data such as annotations and naming conventions associated with the object model. The dynamically generated GUI may provide create, read, update, and delete operations for the object model, without requiring manual coding to the GUI or the object model.

Figure 1:
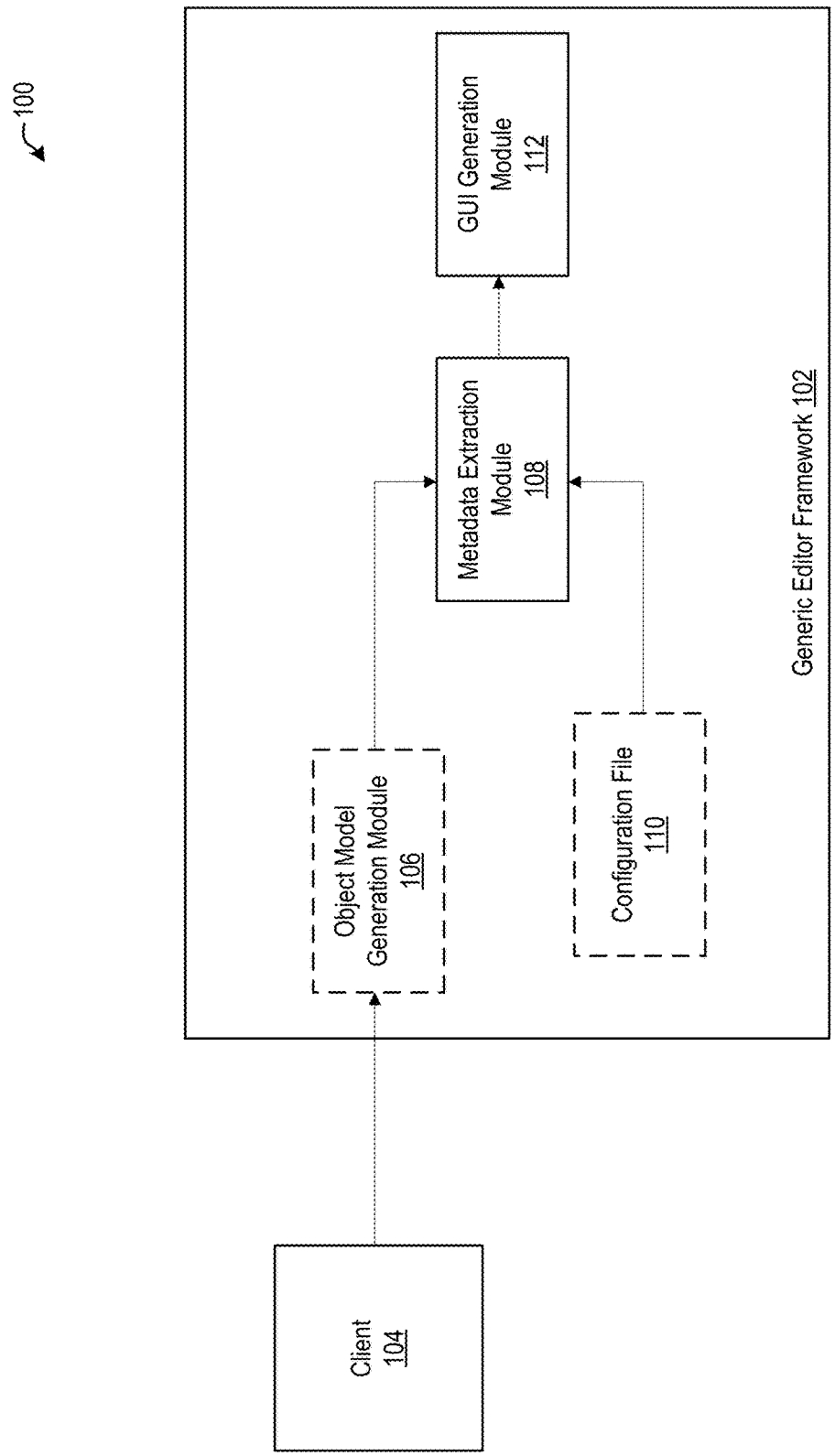
FIG. 1 illustrates an overview of a data integration system, in accordance with an embodiment of the present invention.

FIG. 1 illustrates an overview of a data integration system 100, in accordance with an embodiment of the present invention. One of ordinary skill in the art will appreciate that the data integration system 100 may include more or less components than those shown in FIG. 1.

As shown in FIG. 1, the data integration system 100 may include a generic editor framework 102. In some embodiments, the generic editor framework 102 may be executing locally on a client device 104 (e.g., workstation, desktop, laptop, tablet, or other local computer system), or remotely on a server that communicates with one or more client devices 104. The generic editor framework 102 may include one or more modules, such as an object model generation module 106, a metadata extraction module 108 and a GUI generation module 112.

As used herein, an object model may define objects and their relationships. An object may generally refer to a data structure used to either store or reference data. In some embodiments, an object may model a real-world entity, such as a customer or a purchase order in a database. Using the object model, various object instances may be instantiated and/or persisted. Object models may vary greatly, and typically a new GUI needs to be created (e.g., coded) specifically for a given object model. As described further below, a GUI generation module 112 provided in the generic editor framework 102 may be used to dynamically generate a GUI for an object model. The object model may be received from a user (e.g. client device 104) or received from an object model generation module 106 which generates the object model based on user code. The metadata extraction module 108 may analyze the object model and extract metadata from the object model. The metadata extraction module 108 may pass the metadata to the GUI generation module 112 to dynamically generate a custom GUI for the object model, without any foreknowledge of the object model.

In some embodiments, the object model may be provided to the metadata extraction module 108 which may analyze the object model and extract metadata associated with the object model. The metadata may be provided in the classes as annotations, using naming conventions or in a property file (e.g. a configuration file) associated with the object model. The configuration file may be provided by the user. For example, if the object model is received from a user, the user may have generated the object model using a pre-determined naming convention. This way, the metadata extraction module 108 may recognize the naming convention and extract the metadata from the object model. Alternatively, in the absence of a pre-determined naming convention, the user may include annotations in the object model or in the code representing the object model. The metadata extraction module 108 may recognize the annotations and extract the metadata from the object model. In some embodiments, when the user did not use a pre-determined naming convention and/or annotations, the user may provide a configuration file associated with the object model. The configuration file may allow the metadata extraction module 108 to extract the metadata from the object model. In embodiments where the configuration file is provided along with the pre-determined naming convention and/or the annotations, the configuration file may take precedence over the pre-determined naming convention and/or the annotations.

Once the exemplary persistence metadata regarding an object and its relationship with other objects is extracted, the metadata may be used by the GUI generation module 112 to generate a generic GUI. The metadata may include a list of persistent fields that store primitive values (int, String, etc) associated with an object, a persistent one-to-many ownership relationship among objects, a persistent one-to-one ownership relationship among objects, and a persistent one-to-one reference relationship among objects. According to various embodiments, the object model may include a first class object and a second class object. The first class object and the second class object may be referred as the parent class and the child class. The object of the parent class may own one or more objects of the child class through the one to-many ownership relationship. A persistent one-to-many ownership relationship may be ordered. Moreover, a class may be extended from another class. The first class may be called the base class, while the second class may be called the derived class.

Based on the exemplary metadata discussed above, a generic GUI may include a table control to represent a persistent one-to-many ownership relationship, with the objects on the "many" side displayed as rows in the table control. Any persistent one-to-one reference relationship may be displayed as a dropdown box in the GUI where the referenced object may be selected in the dropdown box. Any persistent fields of an object (e.g., a first class object) may be displayed as a UI control (e.g. textbox, text field, radio button, and the like) which may be configured based on the metadata and/or in response to instructions received from a user, developer, or other system. Any persistent fields or one-to-one reference relationships of objects (e.g., second class objects) may be displayed as table columns in the respective table control. The generated GUI may be further configured so that the various UI controls (e.g. table control, textbox, text field, radio button) may be laid out in a particular order, and be arranged in tabs and/or under collapsible headings. The order of the fields or relationships in the table control may be customized as well. In some embodiments, contents of a table control may be automatically refreshed based on a selection in another (e.g. related) table control. The various UI controls may be connected to the appropriate methods in the corresponding classes to perform operations (e.g. create, read, update, delete) on the object model. The connection may be undertaken based on pre-determined naming conventions, annotations and/or a configuration file associated with the object model.

Using the generic editor framework 102, each generated GUI may be initialized with an editor model class which defines the GUI layout and GUI handlers for metadata retrieval and actions for each first class object. A generic GUI model may be created to provide GUI layout and metadata manipulation for any objects. However, for the generic GUI model to perform appropriate actions, the generic editor may infer the metadata operations that are available from objects for each primitive field or relationship. The method of the object models may either be implemented using a pre-determined naming convention, or additional annotations may be added to the fields or relationships in the class of the object model. In the cases where certain method of the object models do not conform to the pre-determined naming convention and no annotations are found in the classes of the object model, a specific editor model class that extends from the generic GUI model may be implemented to provide the required methods for the generic editor code. Alternatively, a general metadata framework may be provided to capture and provide the metadata.

In general, the method in the specific editor model class may have the highest precedence and may be used to perform the action if the action is defined. The method described in the annotation of the field or the relationship in the class of the object model may be searched next, followed by the method in the class of the object model that conforms to the pre-determined naming convention. If none of the methods are found, such action may be assumed to be not supported for that field or relationship.

Figure 2:
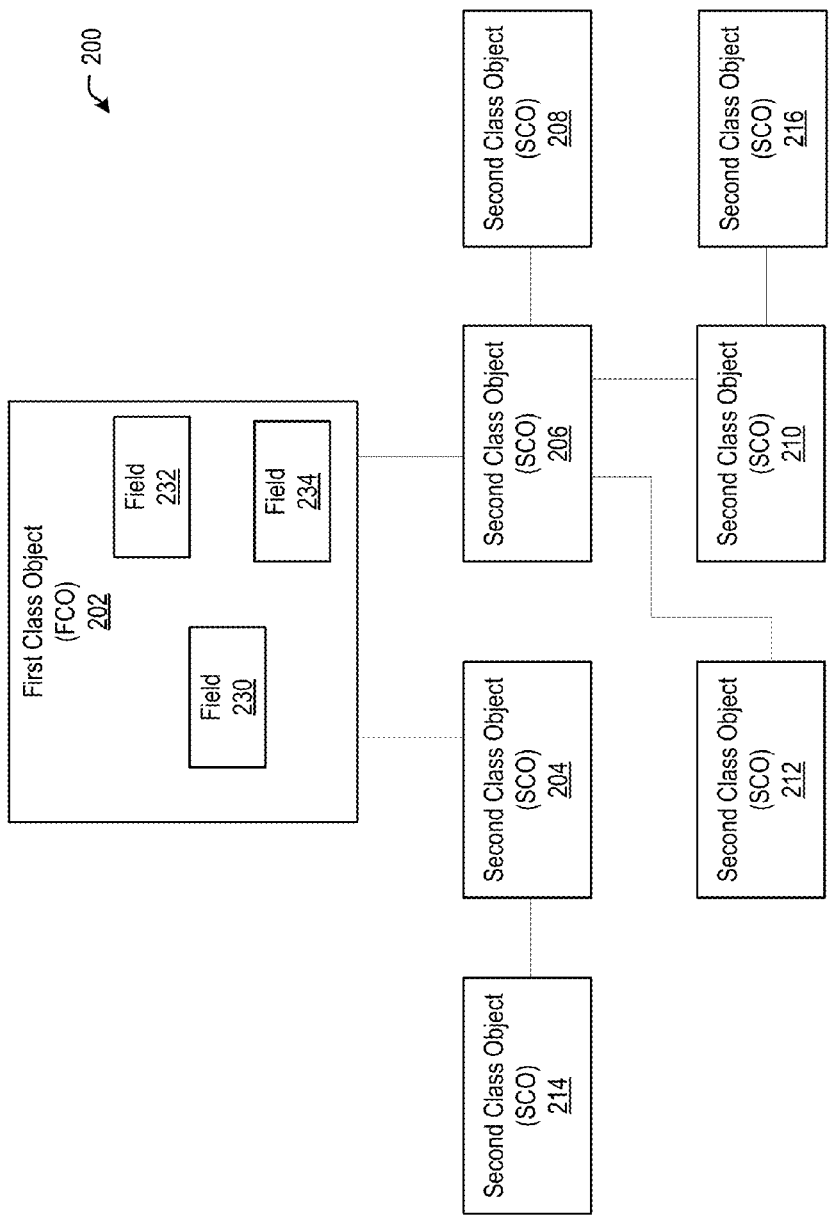
FIG. 2 illustrates an example of an object model, in accordance with an embodiment of the present invention.

FIG. 2 illustrates an example of an object model 200, in accordance with an embodiment of the present invention. As described above, in some embodiments, an object model 200 may include a first class object (FCO) 202 and at least one second class object (SCO) 204, 206, 208. An editor (e.g. a GUI) may be used to edit an object model which is defined at the FCO level. An FCO may be the object that a user considers the top-level object for a "unit of work". Examples of FCOs in the data integration context may include objects like Mapping, Package, Table, etc. An FCO may include other objects which are called second class object (SCOs), such as Mapping Components or Columns.

In some embodiments, metadata may be extracted from the object model 200 and used to dynamically generate and layout a GUI. The metadata may include, one or more classes in the model, e.g., a list of persistent fields that store primitive values (int, String, etc.), persistent one-to-many ownership relationship(s) with another class (e.g., FCO 202 and SCO 204 may be referred to as a parent class and a child class where the object of the parent class "owns" one or more objects of the child class through the one-to-many ownership relationship), a persistent one-to-one ownership relationship with another class, a persistent one-to-one reference relationship to another class, and/or other relationships between classes in the model (e.g., one class (e.g. the derived class) may be extended from another class (e.g. the base class)). In some embodiments, this metadata may be extracted using a pre-determined naming convention, through one or more annotations and/or through a property file.

The object model 200 shown in FIG. 2 includes a first class object (FCO) 202 and seven second class objects (SCO) 204, 206, 208, 210, 212, 214, 216. The SCO 204 includes two SCOs, SCO 212 and SCO 214. The SCO 206 includes two SCOs, SCO 208 and SCO 212. The SCO 210 includes one SCO, SCO 216. The relationship between the FCO 202 and the SCO 206 is a persistent one-to-many ownership relationship. The relationship between SCO 206 and SCO 208 is a persistent one-to-one reference relationship. The FCO 202 may include various persistent fields 230, 232, 234, such as bindingType (Implementation Type: Star or Snowflake), deletePolicy (Delete Parent), loadInvalidParentKeyOption (Load Invalid Parent) and loadNullParentKeyOption (Load Null Parent). Additional visual cues may be used to represent these relationships. In some embodiments, the one or more of the SCOs 204, 206, 208, 210, 212, 214, 216 may include one or more fields, such as persistent fields.

Using the object model 200 illustrated in FIG. 2, an FCO editor (e.g., a dynamically generated GUI for this object model) may be generated, as described below with respect to FIGS. 3A-3D.

FIGS. 3A-3D show examples a dynamically generated graphical user interface (GUI), in accordance with an embodiment of the present invention.

Figure 3A:
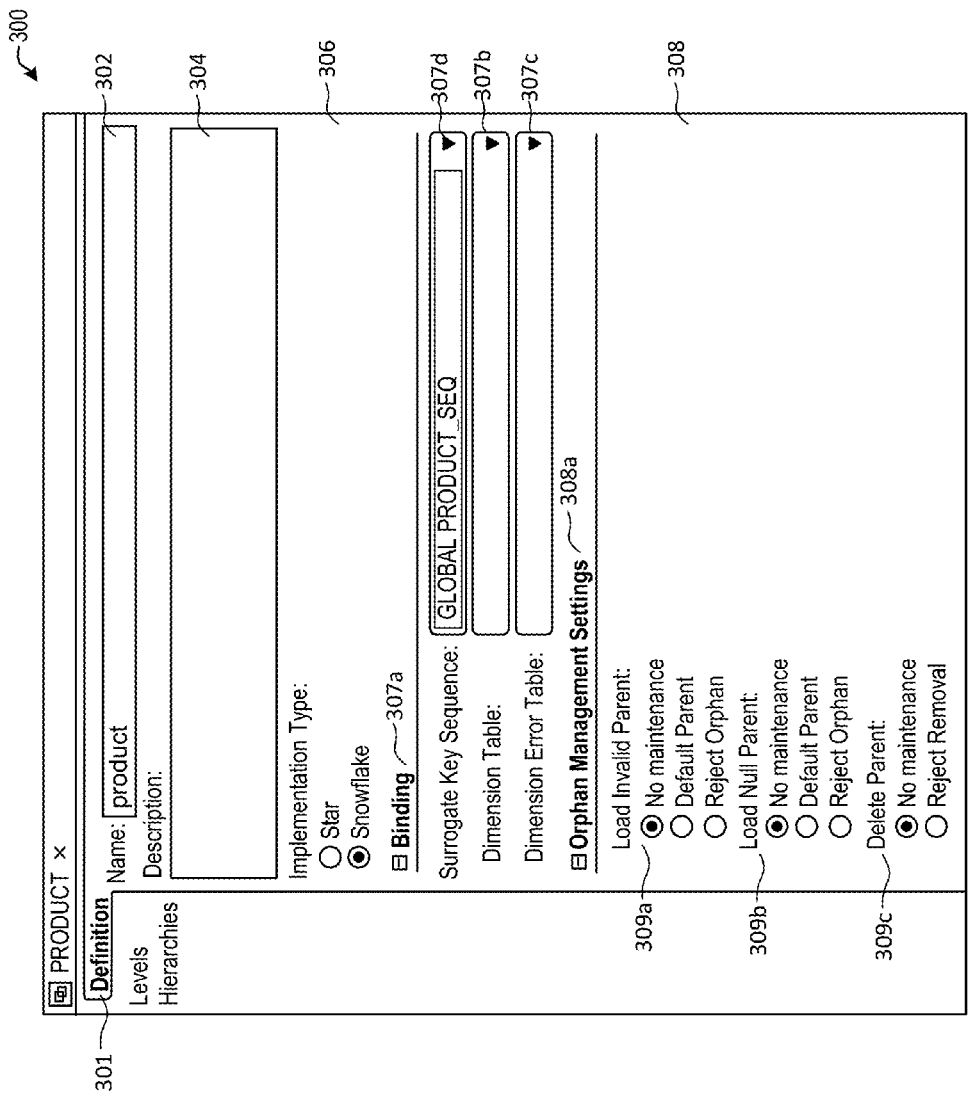

As shown in FIG. 3A, a GUI 300 generated for the object model 200 illustrated in FIG. 2 may include multiple tabs to represent the objects in the object model. The "Definition"

tab 301 shown as active on GUI 300 may represent the object model 200 from the perspective of its FCO 202. The "Definition" tab 301 may include the persistent fields 302-308 such as Name 302, Description 304, Implementation Type 306, and Orphan Management Settings 308 of the FCO 202.

For any primitive field or relationship, the layout of the UI control may be customized to a specific page (e.g., tab) or a specific collapsible heading. A default layout of the UI control may be laid out in the "Definition" tab. In some embodiments, if multiple controls have the same page value, those controls may be laid out in the same tab page, according to the optional order specified. If multiple controls have the same page and heading value, those controls may be laid out in the same tab page under the same collapsible heading. The order value may be global to the controls in the same page.

In addition, for primitive fields, the UI control that may be used to render the field may be customized. A regular UI control may be disabled or hidden, depending on the values of other fields or one-to-one reference relationships within the same editor. The visibility state of the control may be re-evaluated when the value of any primitive field or one-to-one reference relationship is changed. For String fields, either a text field or a text area may be used to render the value in the generic editor. For example, a text field may be used to display name using @GenericLayout (control=ControlType.TEXTFIELD) annotation, while a text area to display description using @GenericLayout (control=ControlType.TEXTAREA) annotation.

For fields that store an enum value, a combo box (dropdown box), radio button, or other control may be used to render the value in the generic editor. For example, a combo box may be used to render a field of enum value. To use radio button instead, the annotation @GenericLayout (control=ControlType.RADIO) may be used.

In a generic editor (e.g., generic GUI), a table control may represent the one-to-many ownership relationship from the first class object 202 to its second class object 204. Since the source class of such table control is the class of the first class object 202 of the editor, the content of the table control may not be driven from other table control. In other cases, if there is a details table control whose source class is the same as the target class of other master table control in the same tab page, the content of the details table control may be driven from the current selection of the master table control. When initializing the generic editor where a table editor model is created for each table control, a selection change event listener may be added to the corresponding master table control such that the content of the details table control may be refreshed. Other regular standalone UI controls (e.g. controls that are not displayed inside a table control) such as text area 304, text field 302, dropdown box (combo box) 307d and radio button 309a illustrated in FIG. 3A are also available to modify a primitive field of a target class. Similar algorithm may be used to drive the object that these controls operate on by listening to the selection change event of table control whose target class is the same as the target class of the control. The generic editor may report an error if the source type of table control or target type of other regular control is not the first class object class, but the master table control may not be located in the same page of the editor. This may happen if controls are spread across multiple pages in the generic editor.

Figure 3B:
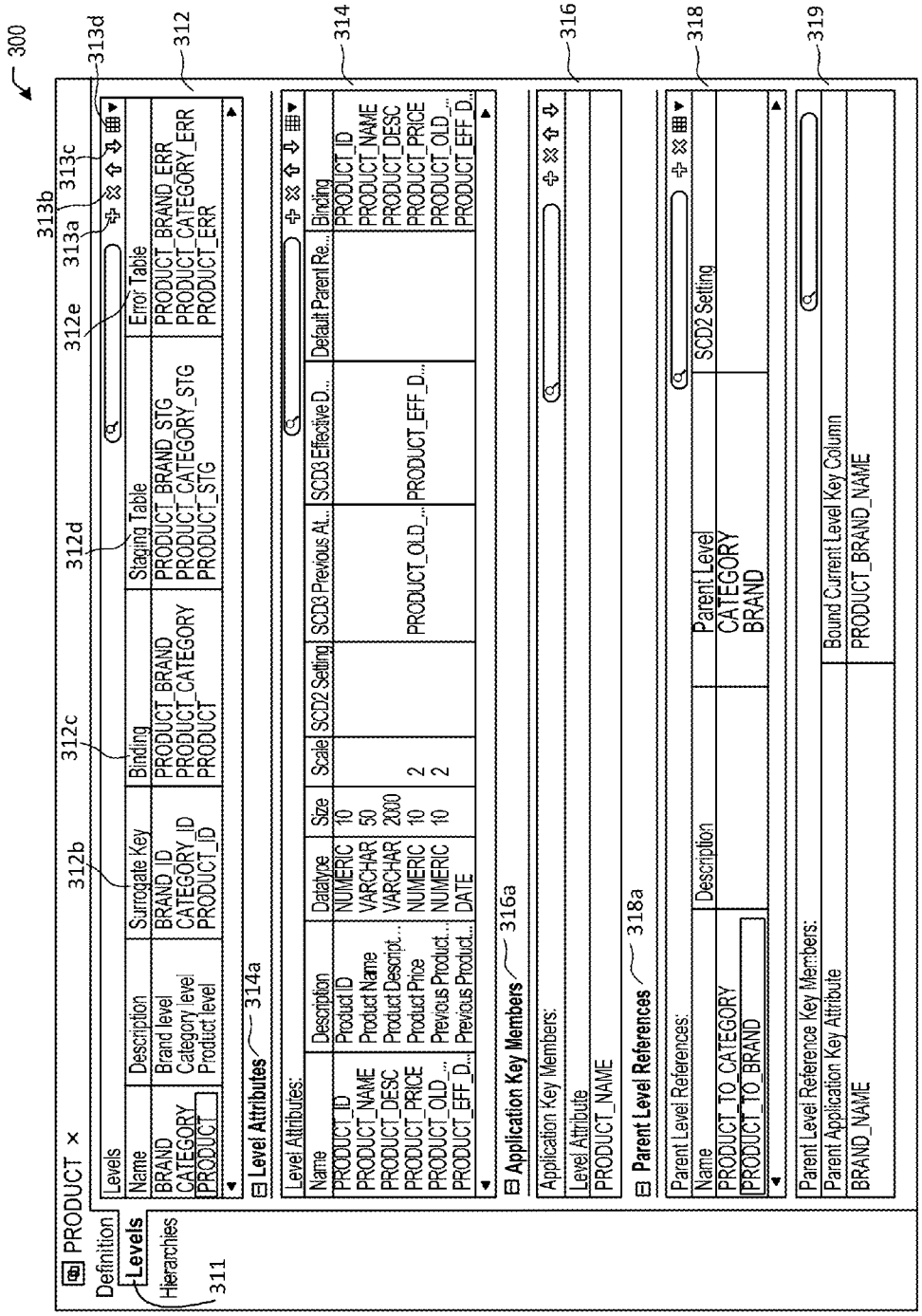

Referring now to FIG. 3B, the second tab 311 of the GUI 300 is illustrated. The second tab 311 may correspond to the SCO 206 of the object model 200 illustrated in FIG. 2. A one-to-many ownership relationship contained in the object model 200 and in the metadata extracted from the object model 200 may be rendered using a table control in the GUI layout. Accordingly, the second tab 311 illustrated in FIG. 3B shows the one-to-many ownership relationships between FCO 202 to SCO 206, SCO 206 to SCO 210, SCO 206 to SCO 208, SCO 206 to SCO 212 using table controls 312, 314, 316, 318 respectively, in the SCO tab 311. One of ordinary skill in the art will appreciate that the relationship between FCO 202 and the multiple SCOs is illustrative and should not be construed as limiting. In some embodiments, there may be a one-to-one ownership relationship between FCO 202 and a given SCO. In other embodiments, FCO 202 may not have any dependent SCOs.

Each table control may be assigned a unique name and may have a source class and a target class. The source represents one-side of the relationship whose object instance owns a collection of child objects of the target class. The column heading and the row content of the table control is supplied through a table model. The list of columns of a table control is provided in a table column model. The table control displays the persistent fields and one-to-one reference relationships of the target class as table columns. If the target class T of the table control TC has one-to-one ownership relationship to another class E, the fields or other one-to-one reference relationship of the class E may be rolled into the table control TC as well.

According to various embodiments, the order of the table controls rendered for the same class of the object model may be reordered. For example, a default order may be used based on how the objects appear on the object model or based on an alphabetical order. In some embodiments, the order can be determined based on annotations. An exemplary annotation @GenericLayout(order=<order number>) may be specified on the one-to-many relationship to change the order of the table controls rendered for the same class of the object model. Embodiments may further enable customizing the order of the table columns in a table control. For a given table control, the table columns may be ordered by default in the same order as in the class of the object model definition. In some embodiments, the order can be customized based on annotations. For example, the annotation @GenericLayout(order=<order number>) may be specified in the class of the object model to change the order of the fields or one-to-one reference relationships within the same class of the object model.

The default column layout of the table control shows all the persistent fields followed by relevant one-to-one-relationships. Fields and relationships of the base class are displayed first. The table model of the table control may be populated with the objects returned for the relationship. If "create" and "remove" actions are available for the one-to-many ownership relationship represented by the table control, the table control may have UI controls such as a add (+) button 313a and a remove (X) button 313b in its toolbar to create or remove objects from the collection owned by the object of source class. A default name may be generated by the generic editor if the create method requires a name as an argument. If "reorder" actions are available for the one-to-many ownership relationship represented by the table control, the table control may have UI controls such as up and down arrows 313c in its toolbar to reorder the selected object in the table control within the collection. If the table column represents a one-to-one reference relationship, a UI control such as a dropdown box 313d can be shown when editing that table column. If the table column represents a field or a one-to-one reference relationship not owned by the target class of the table control but it is through one-to-one ownership relationship from the target class, the generic editor may first check whether the intermediate parent objects along the path already exists. Some columns in the table control may be disabled or hidden, depending on the values of other fields or one-to-one reference relationships within the same editor. The visibility state of the table column may be re-evaluated when the value of any primitive field or one-to-one reference relationship is changed.

For example, the second class object 206 illustrated in FIG. 2 may be called "level" and illustrated with Level table control 312 in FIG. 3B. The Level table control 312 may act as the master table control in the Levels tab 311. Selection changes in Level table control 312 may cause the table controls called Level Attributes 314, Application Key Members 316 and Parent Level References 318 to be refreshed with the appropriate content. The persistent fields of the second class object 210, such as Name, Description, Size (Length) and Scale, may be displayed as text columns in the Level Attributes table control 314. The persistent one-to-one reference relationship from the second class object Level 206 to the second class object Level Attribute 210 may be displayed as one of the columns in the Levels table control 312, and is a dropdown box on a cell in column 312b where the applicable level attributes of the level may be selected as its surrogate key.

As provided above, the referenced object of a one-to-one reference relationship may be rendered as a dropdown box in the generic editor (e.g. the generic GUI). The dropdown box may either be in the main editor pane, or is a cell editor in a table control for the column that represents the one-to-one reference relationship. The list of valid values of the dropdown box may be obtained and the list may be used to populate a combo box model for use by the dropdown box. In some embodiments, the current selected value of the dropdown box may be retrieved. In addition, the current selected value of the dropdown box may be modified. For example, when the user selects another value from the dropdown box, the selected value may be set to the underlying object.

As illustrated in FIG. 3B, objects may be created, removed, reordered or listed using UI controls 313a, 313b, 313c, 313d, respectively. The UI controls 313a-313d may be generated based on the metadata associated with the object model. For example, the table control 316 does not include a list UI control 313d as the entries in the table control 316 may not be listed. Similarly, the table control 318 does not include a reorder UI control 313c as the entries in the table control 318 may not be reordered.

For example, the UI control 313a may be generated based on a naming convention included in the object model. An exemplary naming convention may be a public method with name executeCreateAction_<table control managing the relationship>( ). Alternatively, the UI control 313a may be generated based on an annotation in the object model or based on an indication incorporated in a configuration file associated with the object model. Using the UI control 313a, an action may be created for a one-to-many ownership relationship illustrated with a table control.

For example, the UI control 313b may be generated based on a naming convention included in the object model. An exemplary naming convention may be a public method with name executeRemoveAction_<table control managing the relationship>( ). Alternatively, the UI control 313b may be generated based on an annotation in the object model or based on an indication incorporated in a configuration file associated with the object model. Using the UI control 313b, an action may be removed from a one-to-any ownership relationship illustrated with a table control.

For example, the UI control 313c may be generated based on a naming convention included in the object model. An exemplary naming convention may include two parts: (1) a public method with name executeMoveUpAction_<table control managing the relationship>( ); and (2) a public method with name executeMoveDownAction_<table control managing the relationship>( ). Alternatively, the UI control 313c may be generated based on an annotation in the object model or based on an indication incorporated in a configuration file associated with the object model. Using the UI control 313c, objects of a one-to-many relationship may be reordered.

For example, the UI control 313d may be generated based on a naming convention included in the object model. An exemplary naming convention may be a public method in Level: public List<LevelAttribute>getLevelAttributes( ). Alternatively, the UI control 313d may be generated based on an annotation in the object model or based on an indication incorporated in a configuration file associated with the object model. Using the UI control 313d, a list of methods for the one-to-many relationship may be provided.

Figure 3C:
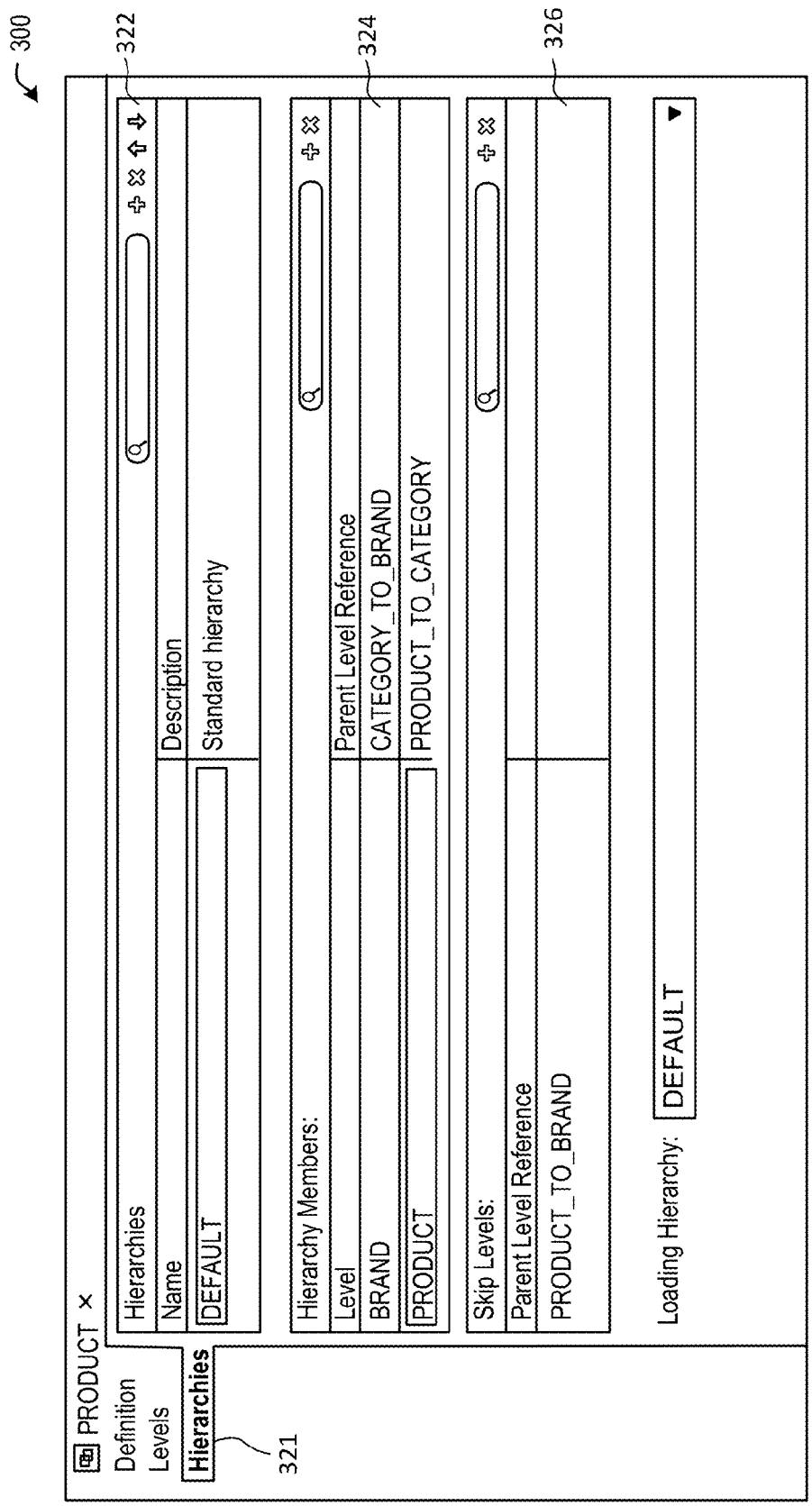

As shown in FIG. 3C, the one-to-many ownership relationships between FCO 202 to SCO 204, and SCO 204 to SCO 212 are displayed as table controls 322, 324, 326, respectively, in the SCO tab 321. The logic behind the generation of the table controls and UI controls illustrated in FIG. 3C are similar to those discussed in connection with FIG. 3B and thus, is omitted here.

FIG. 3D illustrates a sample configuration file 340. The sample configuration file may define the layout of the dynamically generated GUI 300. For example, each tab shown in FIGS. 3A-3C is defined as a separate page 342, 344, 346 on the configuration file 340. Specifically, the Definition tab 301 is defined as a first page 342, the Levels tab 311 is defined as a second page 344 and the Hierarchies tab 321 is defined as a third page 346. The separate pages also appear under the pages section of the configuration file 340 as reference numerals 3001, 3011 and 3021 corresponding to tabs 301, 311 and 321, respectively.

Similarly, the UI controls shown in the GUI are also defined in the configuration file 340. For example, the text filed 302 illustrated in FIG. 3A correspond to line 3002 of the configuration file 340 and the text area 304 corresponds to line 3004 of the configuration file 340. The radio button 306 illustrated in FIG. 3A correspond to line 3006 of the configuration file 340. The combo UI controls 307b, 307c, 307d illustrated in FIG. 3A correspond, respectively, to lines 3007b, 3007c, 3007d of the configuration file 340. The radio button UI controls 309a, 309b, 309c illustrated in FIG. 3A correspond, respectively, to lines 3009a, 3009b, 3009c of the configuration file 340. The combo UI controls 312c, 312e, 312d, 312b illustrated in FIG. 3B correspond, respectively, to lines 3012c, 3012e, 3012d, 3012b of the configuration file 340.

The tables shown in the GUI are also defined in the configuration file 340. For example, tables 312, 314, 316, 318, 319 illustrated in FIG. 3B correspond, respectively, to lines 3012, 3014, 3016, 3018, 3019 of the configuration file 340. Tables 322, 324, 326 illustrated in FIG. 3C correspond, respectively, to lines 3022, 3024, 3026 of the configuration file 340.

The headings shown in the GUI are also defined in the configuration file 340. For example, headings 307a and 308a illustrated in FIG. 3A correspond, respectively, to lines 3007a and 3008a of the configuration file 340. Headings 314a, 316a, 318a illustrated in FIG. 3B correspond, respectively, to lines 3014a, 3016a, 3018 of the configuration file 340.

In addition, or as an alternative, to the configuration file, a GUI layout may be defined based on annotations included in the code underlying the object model.

In various embodiments, the dynamic GUI may be generated using a generic editor framework based on the annotations and/or the configuration file, each editor is initialized with an editor model class which defines the editor layout and UI handlers for metadata retrieval and actions for each first class object. A generic editor model may be created to provide editor layout and metadata manipulation for any objects.

Figure 4:
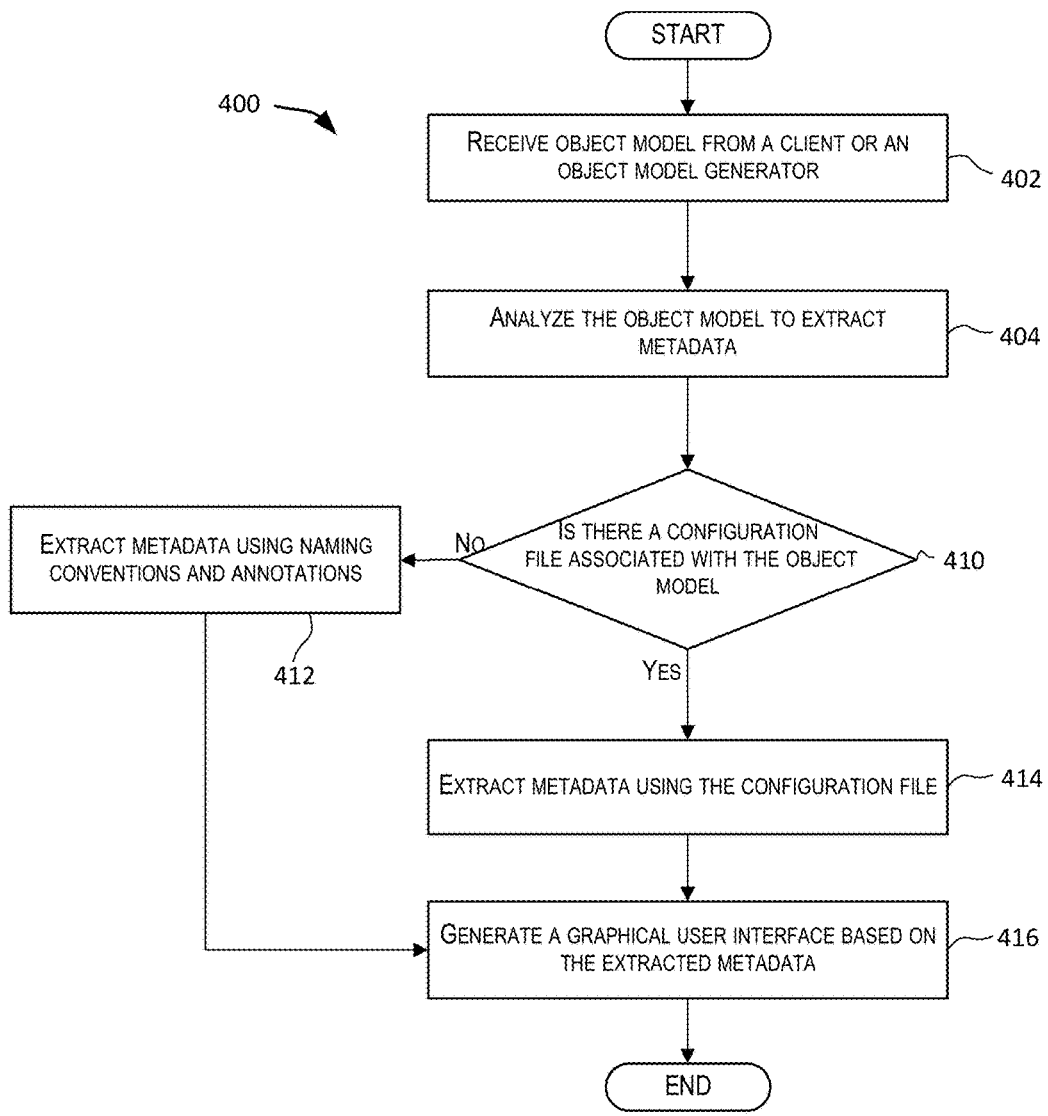
FIG. 4 shows a method performed by a data integration system for generating a graphical user interface (GUI) for an arbitrary object model, in accordance with an embodiment of the present invention.

FIG. 4 illustrates method 400 performed by a data integration system for generating a graphical user interface (GUI) for an arbitrary object model, in accordance with an embodiment of the present invention. At step 402, an object model is received by either a client or an object model generator. For example, a client may provide a user-generated, arbitrary object model to a generic editor framework. Alternatively, the user may provide code to the generic editor framework and an object module generator module of the generic editor framework may generate the object model from the user code. The object model may define a plurality of objects. The plurality of objects may include a first class object and at least one second class object such that a relationship between the first class object and the at least one second class object is a one-to-many ownership relationship or a one-to-one ownership relationship. The plurality of objects may further include at least one second class objects associated with the first class object and one or more second class objects associated with the at least one second class object.

At step 404, a metadata extraction module of the generic editor framework may analyze the object model to extract metadata from the object model. The metadata may describe the plurality of objects of the object model and relationships among the plurality of objects of the object model. In some embodiments, a configuration file may be associated with the object model.

If there is a configuration file associated with the object model ("YES" to step 410), the metadata extraction module may identify the configuration file associated with the object model and extract the metadata based on data included in the configuration file (step 414).

If the object model is not associated with a configuration file ("NO" to step 410), the metadata extraction module may identify additional data incorporated within the object model and extract the metadata based on the additional data. The additional data may include naming conventions and annotations used in the object model or the user code representing the object model.

In some embodiments, the metadata may include one or more of a plurality of fields storing primitive values, a one-to-many ownership relationship among the plurality of objects, a one-to-one ownership relationship among the plurality of objects, a one-to-one reference relationship among the plurality of objects, and an extension relationship among the plurality of objects.

At step 416, a GUI generation module of the generic editor framework may dynamically generate a graphical user interface editor for the object model based on the metadata. The GUI generation module may be compatible with a plurality of object models including the received object model. Accordingly, the GUI generation module may generate GUIs for any given object models without foreknowledge of the object model. Once the GUI is generated for an object model, the object model may be manipulated by editing instances of the object model via the GUI.

In some embodiments, the one-to-one reference relationship in the extracted metadata may be rendered as a dropdown box in the GUI. The one-to-many ownership relationship in the extracted metadata may be rendered as a table control in the GUI. Moreover, the metadata may be used to generate user interface controls in the GUI, the user interface controls including a table control, a dropdown box, a textbox, a text field or a radio button. The GUI may also include user interface controls to create, remove or reorder the plurality of objects based on the relationships among the plurality of objects.

In some embodiments, a configuration file may be provided as well as the pre-determined naming convention(s) and/or annotations in the object model. In such embodiments, the configuration file may take precedence. That is, if there is a conflicting information between the data in the configuration file and the data provided by the naming convention and/or annotations, the metadata may be extracted based on the configuration file. The naming convention and the annotations may be used to complement the configuration data. Accordingly, embodiments may extract metadata using the configuration file as well as the pre-determined naming convention and/or the annotations.

Figure 5:
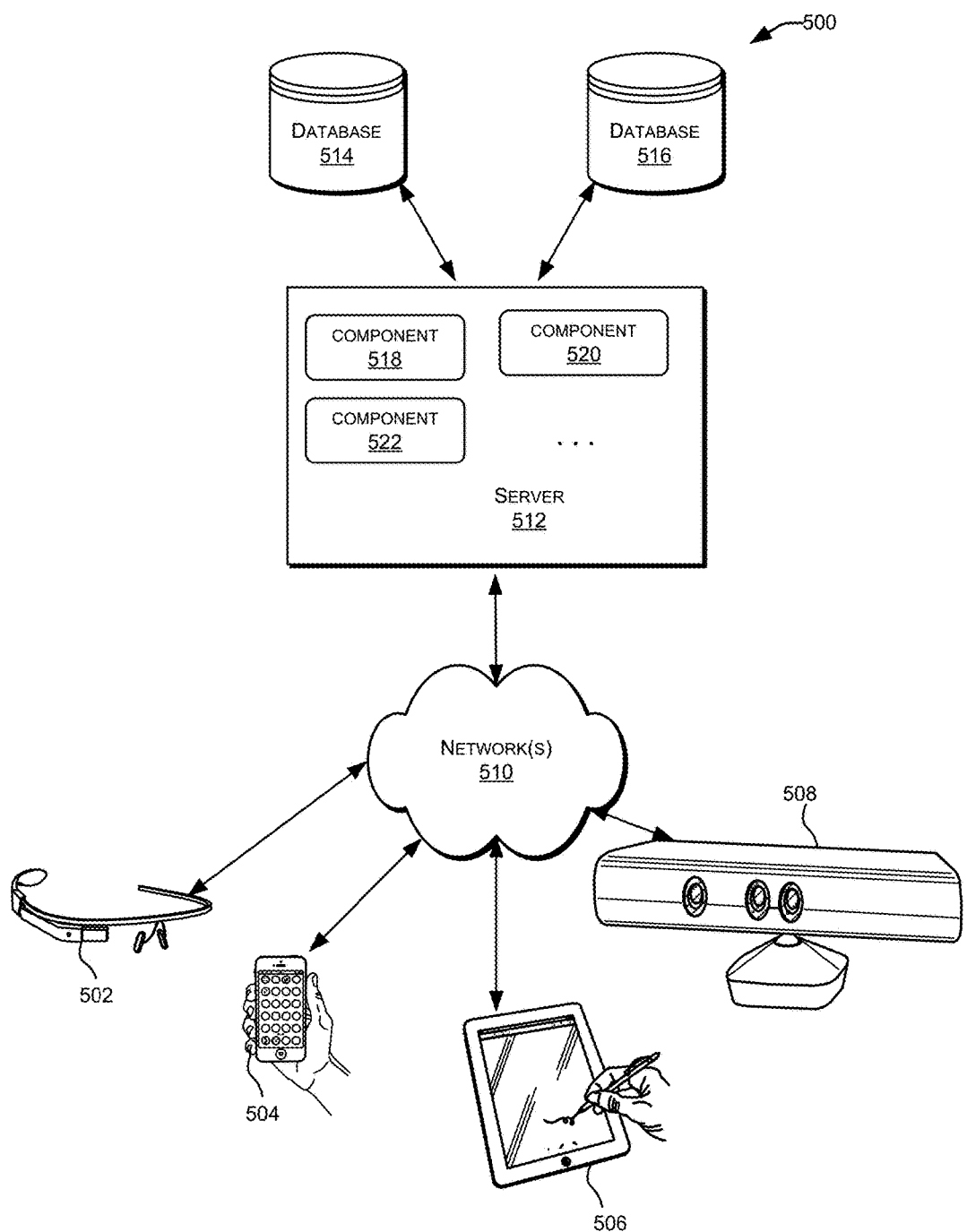
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices may be general purpose personal computers including, by way of example, personal computers and/or laptop computers running various versions of Microsoft Windows®, Apple Macintosh®, and/or Linux operating systems. The client computing devices may be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that may support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 may be a local area network (LAN), such as one based on Ethernet, Token-Ring and/or the like. Network(s) 510 may be a wide-area network and the Internet. It may include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
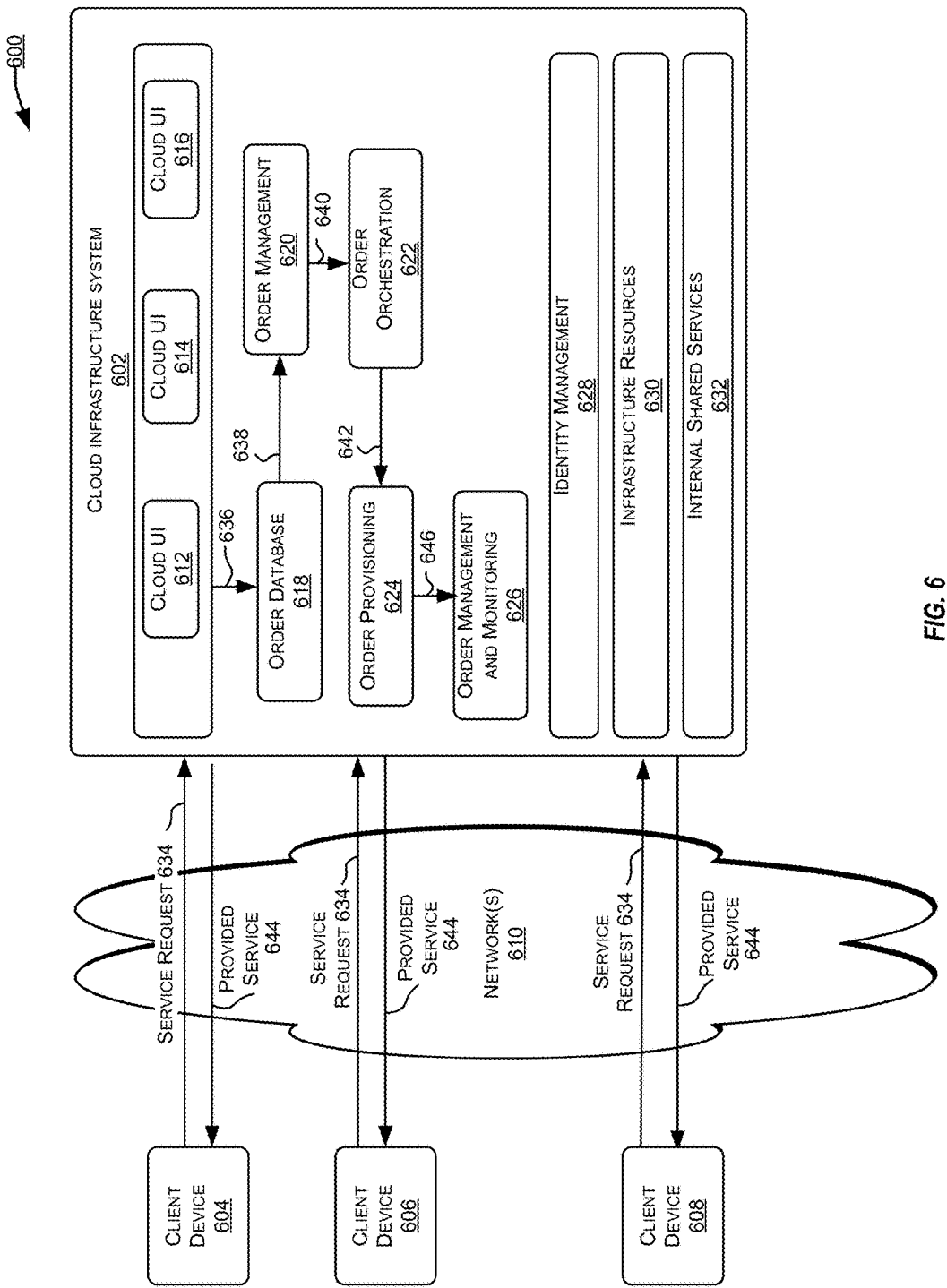
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that may support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system may dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service may include password-protected access to remote storage on the cloud through the Internet. As another example, a service may include a web service-based hosted relational database and a script-language middleware engine for private use by a networked developer. As another example, a service may include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers may utilize applications executing on the cloud infrastructure system. Customers may acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers may acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers may employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 may be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information may include information that authenticates the identities of such customers and information that describes which actions those customers are authorized to perform relative to various system resources (e.g., files, directories, applications, communication ports, memory segments, etc.). Identity management module 628 may also include the management of descriptive information about each customer and about how and by whom that descriptive information may be accessed and modified.

Figure 7:
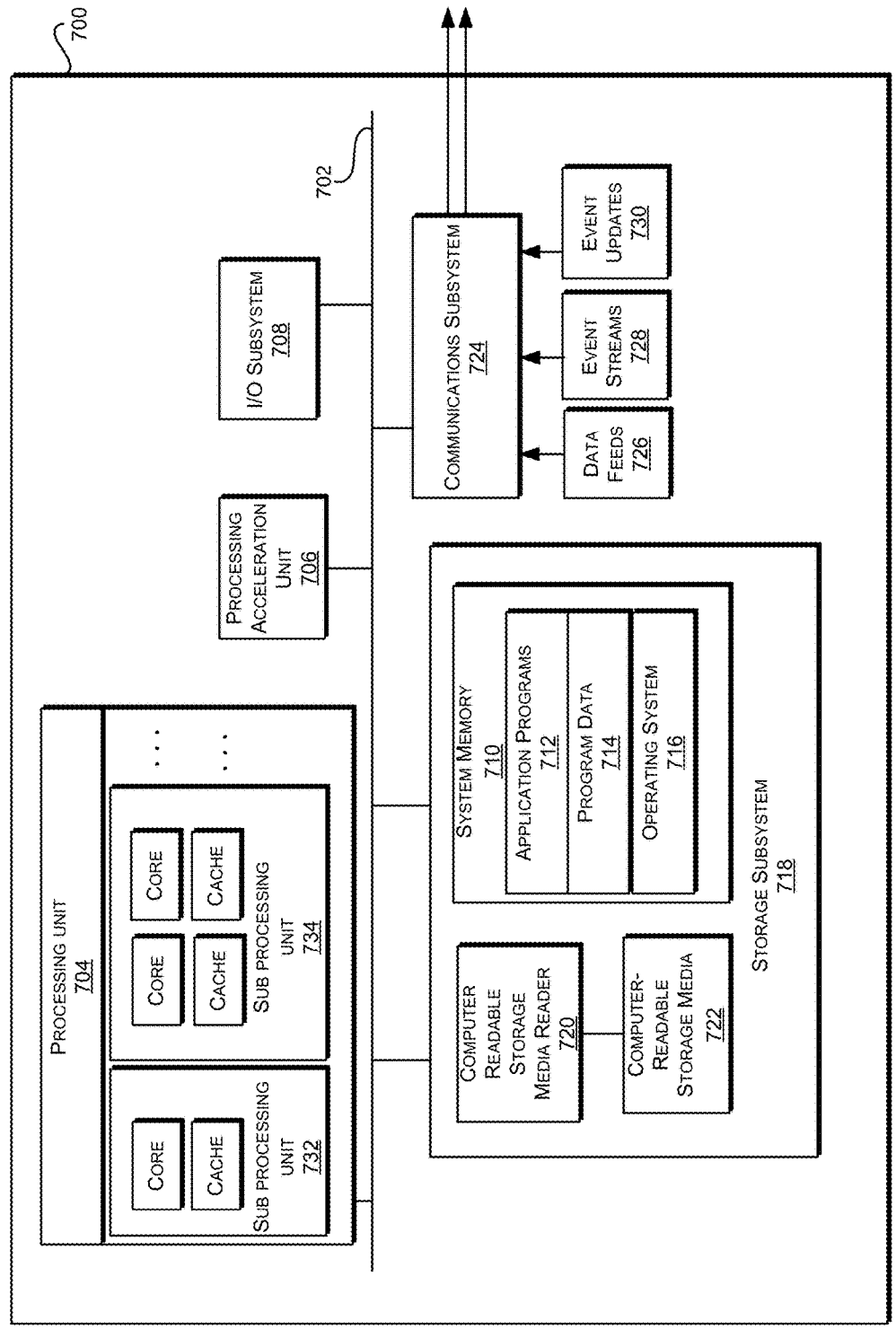
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 704, which may be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 may execute a variety of programs in response to program code and may maintain multiple concurrently executing programs or processes. At any given time, some or all of the program code to be executed may be resident in processor(s) 704 and/or in storage subsystem 718. Through suitable programming, processor(s) 704 may provide various functionalities described above. Computer system 700 may additionally include a processing acceleration unit 706, which may include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that may further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, may also include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium which may be used to transmit the desired information and which may be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 may provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 may be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art may appreciate other ways and/or methods to implement the various embodiments.

In the foregoing specification, aspects of the invention are described with reference to specific embodiments thereof, but those skilled in the art may recognize that the invention is not limited thereto. Various features and aspects of the above-described invention may be used individually or jointly. Further, embodiments may be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a generic editor framework, an object model, wherein the object model defines a plurality of objects;
analyzing, by the generic editor framework, the object model to extract metadata from the object model, wherein the metadata describes the plurality of objects of the object model and relationships among the plurality of objects of the object model;
identifying, by the generic editor framework, a configuration file associated with the object model, wherein the configuration file comprises definitions that define a layout of a graphical user interface editor and wherein the configuration file identifies a plurality of pages and one or more UI controls for each of the plurality of pages;
extracting, by the generic editor framework, the metadata from the object model based on the definitions in the configuration file associated with the object model; and
dynamically generating, by the generic editor framework, the graphical user interface editor for the object model based on the extracted metadata extracted from the object model based on the definitions in the configuration file associated with the object model.

2. The method of claim 1, wherein the plurality of objects include a first class object, at least one second class object associated with the first class object, one or more second class objects associated with the at least one second class object, and wherein a relationship between the first class object and the at least one second class object is a one-to-many ownership relationship or a one-to-one ownership relationship.

3. The method of claim 1, further comprising:
identifying a configuration file associated with the object model; and
extracting the metadata based on data included in the configuration file.

4. The method of claim 1, further comprising:
identifying additional data incorporated within the object model; and
extracting the metadata based on the additional data.

5. The method of claim 1, wherein the graphical user interface editor is generated by a graphical user interface generation module of the generic editor framework, wherein the graphical user interface generation module is compatible with a plurality of object models including the received object model.

6. The method of claim 1, wherein the object model is received from a user.

7. The method of claim 1, wherein the object model is received from an object model generator of the generic editor framework, wherein the object model is generated based on a user-provided code.

8. The method according to claim 1, wherein the configuration file defines a layout of the dynamically generated graphical user interface editor.

9. The method according to claim 8, wherein the plurality of pages comprise a definition page, a level page, and a hierarchies page.

10. The method according to claim 8, wherein the dynamically generated graphical user interface editor comprises a plurality of table controls configured to render a one-to-many ownership relationship contained in the object model and in the metadata extracted from the object model.

11. A non-transitory computer-readable storage memory storing a plurality of instructions executable by one or more processors, the plurality of instructions comprising:
instructions that cause the one or more processors to receive an object model, wherein the object model defines a plurality of objects;
instructions that cause the one or more processors to analyze the object model to extract metadata from the object model, wherein the metadata describes the plurality of objects of the object model and relationships among the plurality of objects of the object model;
instructions that cause the one or more processors to identify a configuration file associated with the object model, wherein the configuration file comprises definitions that define a layout of a graphical user interface editor and wherein the configuration file identifies a plurality of pages and one or more UI controls for each of the plurality of pages;
instructions that cause the one or more processors to extract the metadata from the object model based on the definitions in the configuration file associated with the object model; and
instructions that cause the one or more processors to dynamically generate the graphical user interface editor for the object model based on the extracted metadata extracted from the object model based on the definitions in the configuration file associated with the object model.

12. The non-transitory computer-readable storage memory of claim 11, wherein the plurality of objects include a first class object, at least one second class object associated with the first class object, one or more second class objects associated with the at least one second class object, and wherein a relationship between the first class object and the at least one second class object is a one-to-many ownership relationship or a one-to-one ownership relationship.

13. The non-transitory computer-readable storage memory of claim 11, wherein the plurality of instructions further comprises:
instructions that cause the one or more processors to identify a configuration file associated with the object model; and
instructions that cause the one or more processors to extract the metadata based on data included in the configuration file.

14. The non-transitory computer-readable storage memory of claim 11, wherein the plurality of instructions further comprises:
instructions that cause the one or more processors to identify additional data incorporated within the object model; and
instructions that cause the one or more processors to extract the metadata based on the additional data.

15. The non-transitory computer-readable storage memory of claim 11, wherein the graphical user interface editor is generated by a graphical user interface generation module compatible with a plurality of object models including the received object model.

16. The non-transitory computer-readable storage memory of claim 11, wherein the object model is received from a user.

17. The non-transitory computer-readable storage memory of claim 11, wherein the object model is received from an object model generator, wherein the object model is generated based on a user-provided code.

18. A system comprising:
one or more processors; and
a memory coupled with and readable by the one or more processors, the memory configured to store a set of instructions which, when executed by the one or more processors, causes the one or more processors to:
receive an object model, wherein the object model defines a plurality of objects;
analyze the object model to extract metadata from the object model, wherein the metadata describes the plurality of objects of the object model and relationships among the plurality of objects of the object model;
identify a configuration file associated with the object model, wherein the configuration file comprises definitions that define a layout of a graphical user interface editor and wherein the configuration file identifies a plurality of pages and one or more UI controls for each of the plurality of pages;
extract the metadata from the object model based on the definitions in the configuration file associated with the object model; and
dynamically generate the graphical user interface editor for the object model based on the extracted metadata extracted from the object model based on the definitions in the configuration file associated with the object model.

19. The system of claim 18, wherein the plurality of objects include a first class object, at least one second class object associated with the first class object, one or more second class objects associated with the at least one second class object, and wherein a relationship between the first class object and the at least one second class object is a one-to-many ownership relationship or a one-to-one ownership relationship.

20. The system of claim 18, wherein the set of instructions further comprises instructions, which when executed by the one or more processors, cause the one or more processors to:
identify a configuration file associated with the object model; and
extract the metadata based on data included in the configuration file.

21. The system of claim 18, wherein the set of instructions further comprises instructions, which when executed by the one or more processors, cause the one or more processors to:
identify additional data incorporated within the object model; and
extract the metadata based on the additional data.

22. The system of claim 18, wherein the graphical user interface editor is generated by a graphical user interface generation module compatible with a plurality of object models including the received object model.

23. The system of claim 18, wherein the object model is received from a user.

* * * * *